J. H. PATTEE.
Improvement in Cultivators.
No. 124,218. Patented March 5, 1872.
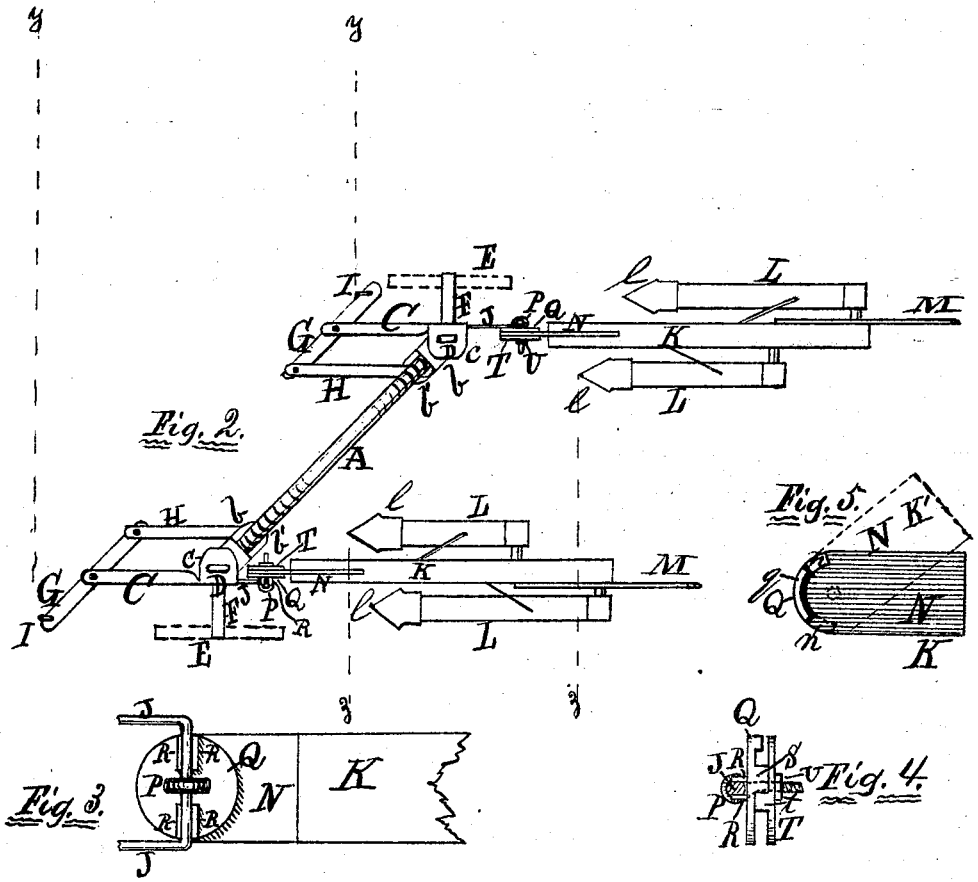
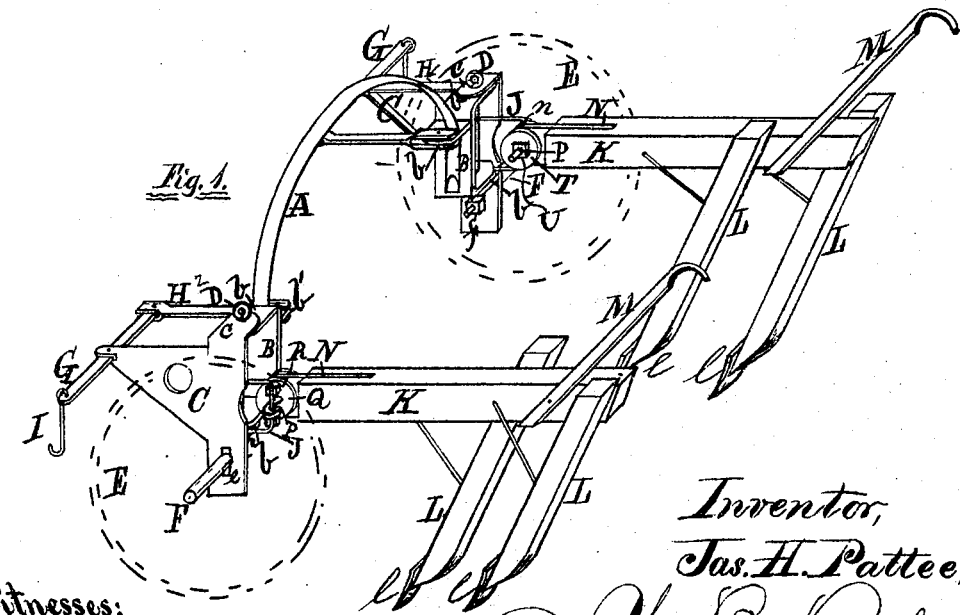
Witnesses:
Platt R. Richards,
J. J. Tunnicliff,
Inventor,
Jas. H. Pattee,
by W. B. Richards,
his atty.

124,218

UNITED STATES PATENT OFFICE.

JAMES H. PATTEE, OF MONMOUTH, ILLINOIS, ASSIGNOR TO HIMSELF, HENRY H. PATTEE, AND ITHAMER P. PILLSBURY, OF SAME PLACE.

IMPROVEMENT IN CULTIVATORS.

Specification forming part of Letters Patent No. 124,218, dated March 5, 1872.

SPECIFICATION.

I, JAMES H. PATTEE, of Monmouth, county of Warren and State of Illinois, have invented certain Improvements in Cultivators, of which the following is a specification:

Nature and Objects of the Invention.

The nature of my invention relates to improvements in straddle-row cultivators, or implements for cultivating both sides of a row of plants simultaneously; and the invention consists, first, in the combination of an elevated axle, supported on wheels, with two plow-beams, carrying plows and handles, and independently hinged to the axle or a frame in connection therewith, so as to permit of their being oscillated laterally or vertically independent of each other, all as hereinafter described; second, it consists in pivoting the wheels to the axle in such manner that the wheels may either one be advanced forward of the other, throwing the axle diagonal with the line of progression, while the wheels preserve the same relative position to the said line of progression; third, it consists in the peculiar construction of the joint by which the beams are hinged to the axle, allowing a free vertical and lateral movement of the beams, while it at the same time holds the axle in an elevated position, and the beams steady against a wabbling motion, all as hereinafter fully described; fourth, it consists in the peculiar construction of the hitching device, allowing the draft animals to advance or recede, the one ahead or in rear of the other, without influencing the plow-beams to the extent of the variation made by the said animals, all as hereinafter fully described.

Description of the Accompanying Drawing.

Figure 1 is a perspective view of my invention. Fig. 2 is a top plan or view. Fig. 3 is a side elevation of the joint by which the beams are hinged to the axle. Fig. 4 is a top view of same joint with the beam-plate removed. Fig. 5 is a side view of the beam-plate and the plate it rests against.

General Description.

A is the axle, bowed or elevated at its central part. B B are plates secured to the ends of the axle A. The ends of the plates B B are turned outward, forming snugs $b\ b\ b\ b$. $b'\ b'$ are snugs projecting inward from the plates B B. C C are triangular-shaped draft-plates, from which project snugs $c\ c\ c\ c$, corresponding with the snugs $b\ b\ b\ b$. D D are pins or bolts, passing through holes in the snugs $c\ c$ and $b\ b$, and thereby pivoting the plates C C to the axle A. E E are the wheels. F F are the wheel-spindles, their inner ends shouldered, threaded, and secured in slots $e\ e$ in the lower ends of the plates C C by nuts $f\ f$. G G are eveners, pivoted near their centers in the forward ends of the plates C C. H H are bars, their forward ends pivoted to the inner ends of the eveners G G, and their rearward ends pivoted to the snugs $b'\ b'$. I I are hooks on the outer ends of the eveners G G, to which the draft animals are attached. J J are bars, round in their cross-section, their central portions vertical, and their ends bent forward at right angles thereto, and attached to the rear side of the plates C C. K K are the plow-beams; L L L L are the shanks, and $l\ l\ l\ l$ the shovels. M M are the handles, same as in ordinary cultivators. N N are the beam-plates, one to each beam, their rear ends attached to the beams K K, their forward ends projecting therefrom and formed as hereafter described. P P are hook-bolts, their hooked ends encircling the vertical parts of the bars J J. Q Q are circular plates pierced with holes through which the shanks of the hook-bolts P P pass. R R R R are lugs on the plates Q, with semicircular grooves on their faces next the bars J J, resting against said bars, and holding the plates Q Q in a vertical position when pressed thereto. $q\ q$ are segmental annular flanges on the outer edge of plates Q Q, which work in segmental annular recesses $n\ n$ on the outer ends of the beam-plates N N. S S are segmental annular flanges projecting from the face of the plates Q Q, around the central holes through the same, forming fulcrums on which the beam-plates N N operate, to allow the beams K K free vertical movement, without resting directly on the shanks of the bolts P P. T T are washers, pierced with holes through which the bolts P P pass, and having segmental annular flanges $t\ t$ on their faces next the beam-plates N N, which flanges fit into the recesses in the flanges S S, and prevent the washers being turned by the frequent vertical movement of the plow-beams. U U are nuts on the outer ends of the bolts P P.

The operation is as follows: The axle is raised and lowered relatively to the wheels E E by adjusting the spindles F F in the slots e e. The axle A is held in a nearly-vertical position by the segmental flanges q q on the plates Q Q, engaging with the ends of the recesses n n in the beam-plates N N, while at the same the recesses n n are a sufficient amount longer than the flanges q q to allow the beams the necessary amount of vertical movement for practical purposes.

At Fig. 2 it is plainly shown that either plow may be advanced forward of the other, and at the same time the beams be kept parallel, and the wheels E E neither inclined to the right or left, the wheel-spindles F F retaining their positions at right angles to the wheel-faces, to the line of progression, and to the plow-beams, each horse drawing his own plow in a great degree independent of the other, either end of the axle A advancing or falling back, turning on the pivotal bolts D D.

The dotted lines Y Y and Z Z at Fig. 2 show plainly by their relative distances apart that the beams K K are not advanced, the one ahead of the other, as much as the draft animals advance, the one ahead of its fellow, the distance of the lines Y Y apart showing the variation of the draft animals, and the distance of the lines Z Z apart showing the variation of the beams.

Claims.

1. The axle A, having plates B, hinged to the wheel spindle-plates C, so that the wheels are retained in the line of progression when one is in advance of the other, as set forth.

2. The plates Q and N, washer T, bolt P, and bar J, operating in combination, for the purpose of hinging the beams to the axle, substantially as set forth.

3. The evener bars G G and bars H H, when combined and arranged to operate with the hinged axle A, plates C, and wheels E E, substantially as and for the purpose specified.

JAMES H. PATTEE.

Witnesses:
 PLATT R. RICHARDS,
 THOS. S. BASSETT.